United States Patent Office 3,511,815
Patented May 12, 1970

3,511,815
DEEP DYEING POLYCARBONAMIDE FILAMENT
Ahmet Nuri Sayin, 138 Holly Oak Drive,
Seaford, Del. 19973
No Drawing. Continuation-in-part of application Ser. No. 630,949, Apr. 14, 1967. This application May 8, 1968, Ser. No. 727,652
Int. Cl. C08g *20/00*
U.S. Cl. 260—78                    5 Claims

ABSTRACT OF THE DISCLOSURE

A synthetic linear polycarbonamide when spun into a filament exhibits increased dyeability and uniformity of cross section. The polycarbonamide is characterized by a high amine end content which amine ends are supplied by an alkylene diamine, an alkylenediammoniumphenylphosphinate and a tertiary amine. The alkylene radical is identical with that of the diamine precursor of the polyamide.

RELATED APPLICATION

This application is a continuation-in-part of my co-pending application, Ser. No. 630,949, which was filed on Apr. 14, 1967, now abandoned.

BACKGROUND

Field of the invention

This invention relates to polyamide fibers having increased ability to receive acid dyes at a faster rate of dyeing and to the process for making such polyamide fibers from higher viscosity polymer in order to improve the uniformity of the desired cross section.

Prior art

Many attempts have been made to improve the dyeability of polyamide fibers by increasing the concentration of amine end groups in the polyamides. These attempts have been fraught with such processing problems as foaming, frequent occurrence of drips of the molten polymer immerging from the spinneret, draw roll wraps and breaks during the drawing of the spun filaments, and non-uniformity of denier or luster.

The art also suggests improving the dyeability of polyamides by preparing copolymers in combination with phosphorous compounds and additional amines. One exemplary combination utilizes small amounts of caprolactam phenylphosphinic acid, and N-aminoethylpiperazine added to polyhexamethylene adipamide. The resultant copolymers yield a fiber having reduced physical properties, for example, lower melting point, lower tenacity, lower modulus.

SUMMARY OF THE INVENTION

The above problems are overcome by the present invention: a synthetic, linear, fiber-forming polycarbonamide having an amine end content up to about 150 gram-equivalents per 1000 kg. of polymer wherein excess amine ends are obtained from 0.17 to 0.56 mole percent of alkylenediammoniumphenylphosphinate, 0.66 to 1.43 mole percent of a tertiary amine, and from 0 to 1.0 mole percent of excess alkylenediamine, mole percent based on molecular weight of repeating unit of polymer, the alkylene radical of the alkylene diamine and the alkylenediammoniumphenylphosphinate corresponding to the alkylene radical of the diamine precursor of the polycarbonamide.

IDENTIFICATION OF DRAWING

The figure is a plot of the percent of amine ends derived from three available sources of amine ends, e.g., from hexamethylenediamine, from hexamethylenediammoniumphenylphosphinate, and from N-aminopropylmorpholine. The percent amine end based on total amine end is plotted along the line perpendicular to the side of the triangle so that 100 percent concentration of any one of the ingredients is represented by a vertex of the triangle. The claimed concentrations of the present invention are within the polygon $\alpha$ $\beta$ $\gamma$ $\delta$ $\epsilon$. The figure is discussed in greater detail following the examples.

EXAMPLES

The following examples are intended to be illustrative of the instant invention. The invention, however, is limited only by the annexed claims.

Example I

A 2697 kilogram aqueous solution containing 50% by weight of hexamethylenediammonium adipate is charged into a stainless steel vessel to which is added 474 grams of a solution containing 10% by weight manganous hypophosphite in water. The charge is concentrated by evaporation to about 75% by weight and transferred to a stainless steel autoclave which is purged of air and filled with nitrogen at a pressure of 17 atmospheres and heated to 195° C. A pre-mixed solution (21.092 kilograms) containing 28.20% aminopropylmorpholine, 24.00% phenylphosphinic acid, 28.75% hexamethylenediamine, and 19.05% water is charged into the pressurized autoclave along with 8.845 kilograms of titanium dioxide prepared as a 20% by weight slurry in water and 34.0 grams of a silicone antifoam. The heating is continued until the temperature ceaches 274° C. and the pressure is gradually reduced to zero. The polymerization cycle is continued as in Example I of U.S. Pat. 2,163,636. Upon completion of the polymerization reaction, the molten polymer is extruded in the form of a ribbon upon a casting wheel. After quenching it is cut into chips suitable for re-melting in a screw melter which feeds a spinning assembly. The polymer is spun at a relative viscosity of 57 into a 68 filament yarn which is textured or bulked by passing through an air jet operated at 270 p.s.i. (18.4 atmosphere) and 285° C. as described in Belgium Pat. 573,230. The denier of the bulked yarn is 1300 and has 130 gram-equivalents of amine ends per 1000 kilograms of polymer, a $T_{3/4}$ time of about 200 seconds and a trilobal cross section. The spinning is continued for a period of five days and the formation of spinning drips observed and recorded. The average time of drip-free spinning for this period is about 9 hours. A comparative control containing 0.8% hexamethylenediammoniumphenylphosphinate and excess hexamethylenediamine to produce a yarn with 130 gram-equivalents of amine ends per 1000 kilograms of polymer of 57 relative viscosity has a drip-life of 2 to 3 hours. A second control with an amine end level of 104 equivalents per 1000 kilograms of polymer from an excess of hexamethylenediamine only has a drip-life of about 45 minutes. The relative viscosity of this yarn was only 39 which could not be increased by extending process conditions.

This example shows that the amine end concentration must be obtained from a portion of each of the amine sources in order to reduce drips, obtain a high relative viscosity, and a high amine end level for a very deep dyeing yarn.

Example II

In a manner similar to Example I, 2697 kilograms of 50% hexamethylenediammonium adipate solution was evaporated to about 75% concentration and then charged in an autoclave. A pre-mixed solution (22.45 kilograms) containing 28.20% aminopropylmorpholine, 24.00% phenylphosphinic acid, 28.75% hexamethylenediamine, nd 19.05% water is charged into the pressurized autolave. Titanium dioxide and manganese hypophosphite are excluded from the composition. After polymerization and casting, the resultant flake is melted and polyethylene oxide is injected into the molten polymer in a transfer line as described in British Pat. 990,713. The spun yarn contains 5% of polyethylene oxide based on the total polymer weight. The yarn is spun as 1500 denier round cross section and textured in the manner similar to Example I by passing through an air jet operated at 270 p.s.i. (18.4 atmosphere) and 285° C. The spun yarn has a relative viscosity of 51. The textured yarn has an amine end concentration of 130 gram-equivalents per 1000 kilograms of polymer and a $T_{3/4}$ dye rate of about 200 seconds.

The spinning is continued for a period of 36 hours and the formation of spinning drips observed and recorded. The average time of drip-free spinning for this period is about 9 hours. A comparative control containing 0.60% hexamethylenediammoniumphenylphosphinate and 0.82% excess hexamethylenediamine to produce a yarn with 130 gram-equivalent amine ends per $10^6$ grams of polymer has a drip-life of 2 to 3 hours.

Example III

In order to show the effect in varying the relative concentrations of aminopropylmorpholine, hexamethylenediammoniumphenylphosphinate, and excess hexamethylenediamine which provide the excess amine ends in the final polymer composition, additional samples were prepared in a manner similar to Example I using the quantities indicated in Table I. The results are summarized in Table II.

TABLE I

| Item No. | Total [NH$_2$][1] | Hexamethylenediammoniumphenylphosphinate | | | | Aminopropylmorpholine | | | | Hexamethylenediamine | | | |
|---|---|---|---|---|---|---|---|---|---|---|---|---|---|
| | | Wt. percent | Mol. percent | [NH$_2$][1] | Percent NH$_2$ | Wt. percent | Mol. percent | [NH$_2$][1] | Percent NH$_2$ | Wt. percent | Mol. percent | [NH$_2$][1] | Percent NH |
| A | 125 | 0.50 | 0.28 | 25 | 20 | 0 | 0 | 0 | 0 | 0.87 | 1.69 | 100 | 80 |
| B | 105 | 0.50 | 0.28 | 25 | 23.8 | 0 | 0 | 0 | 0 | 0.58 | 1.12 | 80 | 76.2 |
| C | 125 | 0.50 | 0.28 | 25 | 20 | 0.42 | 0.66 | 30 | 24.0 | 0.43 | 0.83 | 70 | 56.0 |
| D | 120 | 0.40 | 0.23 | 20 | 16.7 | 0 | 0 | 0 | 0 | 0.83 | 1.60 | 100 | 83.3 |
| E | 120 | 0.80 | 0.45 | 40 | 33.3 | 0 | 0 | 0 | 0 | 0.59 | 1.14 | 80 | 66.7 |
| F | 120 | 1.20 | 0.68 | 60 | 50.0 | 0 | 0 | 0 | 0 | 0.27 | 0.53 | 60 | 50.0 |
| G | 120 | 1.60 | 0.91 | 80 | 66.7 | 0 | 0 | 0 | 0 | 0 | 0 | 40 | 33.3 |
| H | 90 | 0.43 | 0.23 | 20 | 22.2 | 0 | 0 | 0 | 0 | 0.44 | 0.85 | 70 | 77.8 |
| J | 130 | 0.70 | 0.40 | 35 | 26.9 | 0.21 | 0.33 | 15 | 11.5 | 0.59 | 1.15 | 80 | 61.6 |
| K | 130 | 0.70 | 0.40 | 35 | 26.9 | 0.30 | 0.46 | 21 | 16.3 | 0.53 | 1.02 | 74 | 56.8 |
| M | 130 | 0.70 | 0.40 | 35 | 26.9 | 0.42 | 0.66 | 30 | 23.0 | 0.36 | 0.70 | 65 | 50.1 |
| P | 130 | 0.70 | 0.40 | 35 | 26.9 | 0.56 | 0.88 | 40 | 30.8 | 0.21 | 0.40 | 55 | 42.8 |
| Q | 130 | 0.70 | 0.40 | 35 | 26.9 | 0.74 | 1.16 | 53 | 40.8 | 0 | 0 | 42 | 32.3 |
| R | 130 | 0.60 | 0.34 | 30 | 23.1 | 0.50 | 0.78 | 36 | 27.7 | 0.34 | 0.66 | 64 | 49.2 |
| S | 130 | 1.00 | 0.57 | 50 | 38.4 | 0.53 | 0.83 | 38 | 29.3 | 0 | 0 | 42 | 32.3 |
| T | 130 | 0.40 | 0.23 | 20 | 15.4 | 0.74 | 1.16 | 53 | 40.8 | 0.24 | 0.47 | 57 | 43.8 |
| U | 130 | 0.30 | 0.17 | 15 | 11.5 | 0.91 | 1.42 | 65 | 50.0 | 0.12 | 0.23 | 50 | 38.5 |
| Z | 140 | 0.70 | 0.40 | 35 | 25.0 | 0.74 | 1.16 | 53 | 37.8 | 0.15 | 0.29 | 52 | 37.2 |
| Control | 78 | [2] 0.02 | | | | | | | | 1.06 | | 78 | |

[1] [NH$_2$] is the number of gram-equivalent amine ends per 1000 kilograms of polymer. [2] Sodium phenylphosphinate.

TABLE II.—OPERABILITY AND YARN PROPERTIES

| Item No. | Spun yarn | | | Bulked yarn [1] $T_{3/4}$ dye rate, seconds |
|---|---|---|---|---|
| | RV | Drip life, hrs. | Spinning breaks | |
| A | 52 | 2-3 | <0.004 | 80 (steam bulked). |
| B | 56 | +10 | <0.004 | 50 (steam bulked). |
| C | 53 | +10 | <0.004 | 40 (steam bulked). |
| D | 57 | 2-4 | 0.004> Fair | 188 (air bulked). |
| E | | 2-4 | Fair | |
| F | | 2-4 | Poor | |
| G | | 2-4 | Very poor | |
| J | 58 | +10 | <0.004 | |
| K | 54 | 2.5 | <0.004 | |
| L | | 4 | <0.004 | |
| M | 55 | 8-9 | <0.003 | 225 (air). |
| P | 54 | 9-10 | <0.003 | 165 (air). |
| Q | 57 | 10 | <0.004 | 148 (air). |
| R | 56 | 9-10 | <0.003 | 225 (air). |
| S | 58 | 9-10 | <0.004 | |
| T | 51 | 8 | <0.004 | 360 (air). |
| Z | 54 | 7-8 | <0.004 | 255 (air). |
| Control | 57 | 6-7 | <0.004 | 2360 (air). |

[1] $T_{3/4}$ dye rate on bulked yarn samples after scouring with NH$_4$OH and of a condensation product of C$_{18}$ fatty alcohol with 20 moles ethylene oxide at 80° C. for one hour, followed by 4 cold rinses.
Scouring bath: 5 ml. conc. NH$_4$OH and 0.5 g. per liter of a condensation product of C$_{18}$ fatty alcohol with 20 moles ethylene oxide.

The results of these experiments are readily visualized by reference to the figure, which is a composition diagram of the percent of amine ends from the three sources; hexamethylenediamine, hexamethylenediammoniumphenylphosphinate, and N-aminopropylmorpholine. For example, when the concentration of amine ends due to hexamethylenediammoniumphenylphosphinate is too low the polymerization reaction will not proceed to completion resulting in low relative viscosity polymer and poor spinning and drawing performance. Likewise too low concentrations of aminopropylmorpholine produces excessive drips. The concentration of amine ends from hexamethylenediamine should be between the limits of 30 to 55%, from hexamethylenediammoniumphenylphosphinate between 5% to 50% and from aminopropylmorpholine between 20% to 60% of the total amine end groups.

Of the compositions shown in the figure, M, P, Q, R, S, T, U and Z are within the operable area $\alpha\beta\gamma\delta\epsilon$. Of these, the composition R is the most preferred.

GENERAL DESCRIPTION

The polyamides useful in the composition of the present invention are long chain synthetic polymeric polyamides having recurring amides groups, i.e.,

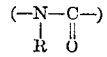

where R is hydrogen or a monovalent hydrocarbon radical having 1 to 10 carbon atoms. The average number of carbon atoms separating the amine groups is at least 2. These polymers are capable of being formed into filaments in which the structural elements are oriented in the direction of the filament axis. These polyamides may be prepared by the reactions of diamines and dicarboxylic acids and their acid-forming derivatives. Typical examples are polyhexamethyleneadipamide, polyhexamethylenesebacamide and the polyamides from bis(paraaminocyclohexyl) methane with azelaic, sebacic, 1,12-dodecanedioic or other aliphatic dicarboxylic acids. A repeating unit of the polymer is defined as

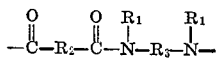

where $R_1$ is a hydrogen or monovalent hydrocarbon radical. $R_2$ and $R_3$ are straight or branched chain alkylene, cycloalkylene, arylene or substituted arylene, diarylene, bis(cycloalkylene) alkylene, and bis(arylene or substituted arylene) alkylene radicals.

Excess amine ends as used in describing this invention are those amine ends present in a polyamide which are in excess of the average number of amine ends which are derived from a balanced (equimolar) polyamide precursor salt. For example, the average amine ends present in polyhexamethylene adipamide derived from a balanced hexamethylenediamine adipate salt are about 40 ends per 1000 kg. of polymer.

The principle of this invention is, of course, applicable to all types of polycarbonamides. It is particularly useful, however, for providing a high amine and content polyhexamethyleneadipamide which has a relative viscosity greater than 45, as demonstrated by the examples. A relative viscosity of 45 for polyhexamethyleneadipamide corresponds to an average molecular weight of about 16,000. The principle of the invention is also applicable to other polycarbonamides, for example, the polycarbonamide produced from 1,12-dodecanedioic acid and bis(p-aminocyclohexyl) methane having a molecular weight as low as 8,000.

Polyhexamethylene adipamide preferably has a relative viscosity of between 45 and 100. The relative viscosity is defined as the ratio of absolute viscosity at 25° C. (in centipoises) of a solution of 8.4% polymer by weight in 90% formic acid (10% water and 90% formic acid), i.e., 11.0 g. of polymer in 100 ml. 90% formic acid, to the absolute viscosity at 25° C. (in centipoises) of the 90% formic acid. In general, a relative viscosity of at least about 15 is required to provide a fiber-forming polymer which is melt-spinnable.

The polyamides of this invention must have an excess of amine end groups over caboxyl end groups. It is a common practice to describe the amine ends in terms of the number of gram-equivalents of amine groups that are present in $10^6$ g. of polymer. This method is described more fully in G. B. Taylor and J. E. Waltz "Anal. Chem.," vol. 19, page 448 (1947).

The concentration of amine end groups in polyamide polymer may also be determined by a spectrophotometric method using a specific acid dye. This analysis involves making a solution of nylon in formic acid and then precipitating and dyeing it simultaneously by addition of an aqueous dye solution. The resulting depletion of dye is measured spectrophotometrically. The analytical procedure for this dye capacity method is as follows: 1.000 ±0.002 g. of yarn or ground flake sample is dissolved in 15.0 ml. of 90% formic acid solution. To this solution, from a buret 200.0 ml. of 0.045% Color Index No. 63010 (a disulfonated acid dye) dye solution is added gradually and with stirring. The rate of dye addition is adjusted to keep the precipitated polyamide continuously in motion in the stirred solution. The dye solution is filtered and a sample of 10.0 ml. is diluted to 50.0 ml. The optical density is then determined on a spectrophotometer at 595 millimicron wavelength against water as reference using one centimeter cells. The amine end equivalents per $10^6$ grams of polyamide are calculated from:

$$[NH_2], \text{eq.}/10^6 \text{gms.} = \left(\frac{A_B - A_S}{A_B}\right) 180$$

where:

$A_B$ = Optical density for blank, i.e., formic acid and dye solution only.
$A_S$ = Optical density for sample.
180 = (0.045) (200) (20)
0.045 = Concentration of Color Index. No. 63010 dye solution.
200 = Volume (ml.) of Color Index No. 63010 dye solution.
20 = Calibration constant.

The preferred concentration of total amine end groups of this invention is 120 to 140 gram-equivalents per 1000 kilograms of polymer which has the following composition:

TABLE III.—COMPOSITION IN POLYHEXAMETHYLENEADIPAMIDE POLYMER

| | $[NH_2]$ [1] | Wt. percent | Mol. percent |
|---|---|---|---|
| Hexamethylenediammoniumphenylphosphinate | 20–35 | 0.4–0.7 | 0.23–0.40 |
| N-aminopropylmorpholine | 30–53 | 0.42–0.74 | 0.66–1.16 |
| Hexamethylenediamine | 52–65 | 0.15–0.36 | .29–0.7 |

[1] $[NH_2]$ is the number of gram-equivalents of amine ends per $10^6$ grams of polymer.

While the examples illustrate the use of hexamethylene diamine and hexamethylenediammoniumphenylphophinate in a polyhexamethyleneadipamide, the excess amine ends can be supplied to any given polycarbonamide by using the alkylene diamine and the alkylenediammonium-phenylphosphinate corresponding to the diamine used for preparing the polyamide. The same ranges of amine ends, expressed in mole percent, are applicable to all polycarbonamides prepared using the instant invention.

The compounds may, of course, be added to the polymer ingredients prior to evaporation of the polyamide salt solution, or they may be added to the polymer itself during polymerization. The compounds may be added as a pre-mixed solution, or may be added separately or may be formed in situ. Other tertiary amines which are operable within the scope of this invention are lower alkyl N-aminoalkylmorpholines. Suitable alkyl substituents are ethyl, propyl, butyl, pentyl and hexyl.

The rate of dyeing the polymer with acid dyes is determined by measuring the time required for depletion of 75% of the dye added to a dye bath under a given set of conditions. It is reported as the $T_{3/4}$ time and expressed in seconds.

In one embodiment of the present invention a polymer is used which contains a small amount of a conventional delusterant such as titanium dioxide, barium sulfate, aluminum trioxide, and the like. Such materials in amounts employed are disclosed in U.S. Pat. 2,205,722. Preferably, from 0 to 1.0%, and generally not exceeding about 5% (by weight based on the weight of the polymer) of finely divided titanium dioxide is used for delustering purposes. It should be noted that the drip frequency of a polymer during spinning increases in proportion to the concentration of titanium dioxide in the polymer. The present invention minimizes the drip problem while producing a deeply acid dyeable nylon with high titanium dioxide content. In another embodiment of the present invention polymer is used which contains a small amount of a polyalkylene oxide as described in British Pat. 990,713.

What is claimed is:

1. A synthetic fiber of linear polyhexamethyleneadipamide having an amine end content of from about 120 to 150 gram equivalents per 1000 kg. of polymer wherein excess amine ends are obtained from 0.23 to 0.40 mol percent of hexamethylenediammoniumphenylphosphinate, 0.66 to 1.16 mol percent of lower alkyl N-aminoalkylmorpholine, and from 0.29 to 0.7 mol percent of excess hexamethylenediamine, said polyhexamethyleneadipamide having a relative viscosity of at least 45 defined as the ratio of the absolute viscosity at 25° C. of a solution of 8.4% polymer by weight in 90% formic acid to the absolute viscosity at 25° C. of 90% formic acid.

2. The polycarbonamide fiber of claim 1 wherein said tertiary amine is N-aminopropylmorpholine.

3. The polycarbonamide fiber of claim 1 having a relative viscosity in the range of from 45 to 100.

4. The polycarbonamide fiber of claim 1 containing at least 2% by weight of a poly(alkylene ether) antistatic composition.

5. The polycarbonamide fiber of claim 1 wherein 47% to 52% of said amine end groups are obtained from hexamethylenediamine, 22% to 26% of said amine end groups are obtained from hexamethylenediammoniumphenylphosphinate, and 27% to 30% of said amine end groups are obtained from N-aminoalkylmorpholine.

References Cited

UNITED STATES PATENTS

| | | | |
|---|---|---|---|
| 2,130,948 | 9/1938 | Carothers | 260—78 |
| 2,585,199 | 2/1952 | Watson | 260—78 |
| 2,904,536 | 9/1959 | Reith | 260—78 |
| 2,981,715 | 4/1961 | Ben | 260—78 |
| 2,989,798 | 6/1961 | Bannerman | 260—78 |
| 3,078,248 | 2/1963 | Ben | 260—78 |
| 3,235,534 | 2/1966 | Brinkman et al. | 260—78 |
| 3,365,428 | 1/1968 | Wujciak | 260—78 |
| 3,386,967 | 6/1968 | Twilley | 260—78 |

FOREIGN PATENTS

| | | |
|---|---|---|
| 825,089 | 12/1959 | Great Britain. |
| 890,437 | 2/1962 | Great Britain. |

HAROLD D. ANDERSON, Primary Examiner

U.S. Cl. X.R.

8—55; 260—37, 45.7, 45.9

PO-1050
(5/69)

UNITED STATES PATENT OFFICE
CERTIFICATE OF CORRECTION

Patent No. 3,511,815      Dated May 12, 1970

Inventor(s) Ahmet Nuri Sayin

It is certified that error appears in the above-identified patent and that said Letters Patent are hereby corrected as shown below:

Column 1, line 4, after "19973" insert -- assignor to E. I. du Pont de Nemours and Company, Wilmington, Delaware, a corporation of Delaware --.

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,511,815          Dated May 12, 1970

Inventor(s) Ahmet Nuri Sayin

It is certified that error appears in the above-identified patent and that said Letters Patent are hereby corrected as shown below:

Column 1, cancel beginning with line 69 through column 2, line 9.

Column 4, cancel line 56 through "N-aminopropylmorpholine" in line 60.

Column 4, cancel lines 73-75.

SIGNED AND
(SEALED)
NOV 24 1970

(SEAL)
Attest:

Edward M. Fletcher, Jr.
Attesting Officer

WILLIAM E. SCHUYLER, JR.
Commissioner of Patents